United States Patent
Xu et al.

(10) Patent No.: US 10,744,480 B2
(45) Date of Patent: Aug. 18, 2020

(54) ROTARY DEVICE FOR CONDUCTING CHEMICAL REACTIONS

(71) Applicant: Coolbrook Oy, Helsinki (FI)

(72) Inventors: Liping Xu, Cambridge (GB); Budimir Rosic, Oxford (GB)

(73) Assignee: Coolbrook Oy, Helsinki (FI)

( * ) Notice: Subject to any disclaimer, the term of this patent is extended or adjusted under 35 U.S.C. 154(b) by 0 days.

(21) Appl. No.: 16/598,374

(22) Filed: Oct. 10, 2019

(65) Prior Publication Data

US 2020/0114332 A1 Apr. 16, 2020

Related U.S. Application Data

(60) Provisional application No. 62/743,707, filed on Oct. 10, 2018.

(51) Int. Cl.
*B01J 19/18* (2006.01)
*C10G 1/04* (2006.01)
*C10G 11/00* (2006.01)
*C10G 9/00* (2006.01)
*B01J 16/00* (2006.01)

(52) U.S. Cl.
CPC .......... *B01J 19/18* (2013.01); *B01J 16/005* (2013.01); *C10G 1/04* (2013.01); *C10G 9/00* (2013.01); *C10G 11/00* (2013.01); *C10G 2300/104* (2013.01); *C10G 2300/1014* (2013.01); *C10G 2300/1048* (2013.01)

(58) Field of Classification Search
CPC ......... B01J 19/18; B01J 16/005; C10G 11/00; C10G 9/00; C10G 1/04; C10G 2300/104; C10G 2300/1014; C10G 2300/1048
USPC ....................................................... 422/225
See application file for complete search history.

(56) References Cited

U.S. PATENT DOCUMENTS

| 4,265,732 A | 5/1981 | Dinulescu |
| 9,371,815 B2 * | 6/2016 | Franco de Oliveira Falcao ......... F03B 3/12 |
| 9,810,195 B2 * | 11/2017 | Natanzi ................. F03B 13/142 |
| 2013/0011251 A1 * | 1/2013 | Franco de Oliveira Falcao ......... F03B 3/12 415/208.2 |
| 2015/0233339 A1 * | 8/2015 | Natanzi ................. F03B 13/142 415/1 |

FOREIGN PATENT DOCUMENTS

WO 2016001476 A1 1/2016

OTHER PUBLICATIONS

International Search Report and Written Opinion, PCT/FI2019/050723, dated Jan. 27, 2020 (11 pp.).

* cited by examiner

*Primary Examiner* — Huy Tram Nguyen
(74) *Attorney, Agent, or Firm* — Eversheds Sutherland (US) LLP

(57) ABSTRACT

An apparatus 100 for conducting chemical reactions in a process fluid is provided, comprising a central shaft 1 with a number of axial-radial rotors 3 mounted thereon, a plurality of stationary vanes 2 disposed upstream the rotor and a mixing space 4 disposed downstream of the rotor, wherein the mixing space is configured to convert mechanical energy imparted to the process fluid by the rotor into internal energy of said process fluid and to establish conditions for an at least one chemical reaction in the process fluid to occur. Related arrangement, method and uses of the apparatus are further provided.

42 Claims, 7 Drawing Sheets

ROTARY DEVICE FOR CONDUCTING CHEMICAL REACTIONS

CROSS REFERENCE TO RELATED APPLICATION

This application claims priority to U.S. Provisional Patent Application No. 62/743,707, filed Oct. 10, 2018, the subject matter of which is expressly incorporated herein by reference in its entirety.

FIELD OF THE INVENTION

The present invention relates to the field of rotary turbomachines. In particular, the invention concerns a rotary apapratus for conducting chemical reactions, related arrangement, method and uses.

BACKGROUND

Chemical reactions, in particular, a variety of thermal and thermochemical processes, such as pyrolysis or cracking, are traditionally utilized in petroleum refineries and petrochemical plants. With demand for energy increasing worldwide on the background of unstable pricing and restrictive environmental policy requirements, the oil and gas industry faces a number of challenges, such as development of production technologies with enhanced energy efficiency and reduced environmental footprint. Those are also issues to consider for the development of one of the main petrochemical processes—large-scale production of lower (low molecular weight) olefins.

Low-molecular olefins, such as ethylene, propylene and butylenes, are primary components of petrochemical industry and serve as a basic building blocks in commercial production of plastics, polymers, elastomers, rubbers, foams, solvents, and chemical intermediates, as well as of fibers, including carbon fibers, and coatings. Existing technologies for production of lower olefins, which comprise pyrolysis of medium weight hydrocarbons, such as naphtha or gasoil and light hydrocarbons like pentanes, butanes, propane and ethane, down to lightweight substantially unsaturated polymerizable components, are commonly implemented in tubular furnaces. The latter imposes severe restrictions on pyrolysis processes: due to the fact that the operation is based on heat transfer, to maintain a satisfactory temperature distribution inside the reactor tubes remains a challenge.

On the whole, cracking of hydrocarbons is typically optimized by regulating at least a process temperature, residence time(s) and partial pressure of hydrocarbons. In conventional cracking furnaces controllability over the above mentioned kinetic parameters is restricted due to limitations imposed by the structures of the existing reactor solutions.

For example, in conventional tubular reactors heat energy is delivered to a reaction space through the reactor walls, whereby the reactor apparatus acts as a heat exchanger. Since heat transfer from the tube walls to the process fluid has its physical limits, in some instances raising the temperature such, as to achieve a desired reaction outcome, is impossible. Additionally, changing/controlling pressure in the reaction space of the conventional tubular (axial) reactors is challenging.

Thus, due to insufficient feedstock heating rate in tubular furnaces duration of pyrolysis process increases, which results in a situation, when formed at initial stages olefins reside in the reactor furnace for sufficiently long time to begin entering into secondary reactions thus considerably reducing the outcome of a target product. One of secondary products is coke, which causes heat transfer problems in tubes and fouling of the downstream equipment.

Additionally, in existing reactor solutions temperature gradients are very high. Thus, the temperature along the reactor walls is typically very high in comparison to its' center (as viewed along the entire reaction chamber). Since the fluid flow is faster in the center than in the areas adjacent to the reactor walls, large temperature gradient causes severe coking problems.

Furthermore, in existing reactor solutions residence times (times that the feedstock-containing process fluid spends in the reaction space) remain outside the scope of optimization.

Traditional technology does not offer reasonable solutions to the problems mentioned above due the fact that at a time being the conventional pyrolysis furnaces have already reached their technical limits, in terms of modifying heat transfer rates and/or adjusting the reaction temperature parameters and the reaction outcome, accordingly.

Traditional process for producing low-molecular weight hydrocarbons by thermal degradation thus encounters a major problem of lack of controllability over an entire process, therefrom a range of the secondary problems arises as follows: 1. poor performance factor for tubular furnace reactors; 2. loss of valuable feedstock material; 3. long reaction times; 4. high secondary reactions rates; 4. high energy consumption; 5. non-optimum (less than possible) product yield and selectivity.

SUMMARY OF THE INVENTION

An objective of the present invention is to solve or to at least mitigate each of the problems arising from the limitations and disadvantages of the related art. The objective is achieved by various embodiments of an apparatus for conducting chemical reactions in a process fluid, related arrangement, method and uses. Thereby, in one aspect of the invention an apparatus for conducting chemical reactions in a process fluid is provided, according to what is defined in the independent claim 1.

In embodiment, said apparatus comprises a central shaft with a number of axial-radial rotors mounted thereon, each said rotor comprises a plurality of axial-radial rotor blades arranged over a circumference of a disk mounted onto the central shaft, a plurality of stationary vanes disposed upstream of the rotor, and a mixing space provided as a vaneless or vaned mixing space disposed downstream of the rotor, wherein the mixing space is configured to convert mechanical energy imparted to the process fluid by the rotor into internal energy of said process fluid and to establish conditions for an at least one chemical reaction in the process fluid to occur.

In embodiment, that said apparatus comprises at least two rotors mounted onto the central shaft one after another.

The plurality of stationary vanes, the plurality of axial-radial rotor blades and the mixing space establish, in some embodiments, a process stage configured to mediate a complete energy conversion cycle.

In embodiment, in said apparatus, the stationary vanes are preferably inlet guide vanes configured to direct a process fluid flow into the rotor in a predetermined direction such, as to control the specific work input capability of the rotor. Said stationary vanes are prefereably further configured to direct the process fluid flow, with a preswirl, into the rotor in a direction essentially along a meridional axisymmetric plane X—r.

In embodiment, in said apparatus, the rotor blades are configured, upon rotation of the rotor, to receive the essentially axial process fluid flow from the stationary vanes and to further turn said flow, with a swirl, into an essentially radial direction, thus imparting mechanical energy to the process fluid by increasing tangential velocity thereof.

In embodiment, in said apparatus, the rotor is further configured, in terms of profiles and dimensions of the rotor blades and disposition thereof on the disk, to control mechanical energy input to the process fluid.

In embodiment, the at least one rotor provided in the apparatus comprises a shroud configured to cover the plurality of the rotor blades.

In embodiment, in said apparatus, the mixing space is preferably configured to convert kinetic energy or mechanical energy of the process fluid into internal energy of said process fluid. Said mixing space is preferably established by a conduit comprising at least a bend section followed by a return channel section. In embodiment, the mixing space within each stage is configured adjustable in terms of its geometry and/or dimensional parameters. In said mixing space, any one of the bend section and the return channel section is preferably configured adjustable in terms of at least shape, length, cross-section and spatial disposition within the apparatus.

In some embodiment, the mixing space further comprises an at least one additional component including, but not limited to a stationary vane or vanes, a turbulator device, a throttle device, a gauze, a flow guide, slots and insertable and/or removable components, and the like. The mixing space can further comprise a diffuser, which can be vaned or vaneless.

In embodiment, the stationary vanes and/or the rotor blades within said apparatus are preferably configured to vary within each stage in terms of at least dimensions, alignment and spatial disposition thereof, as preset or as manufactured. In embodiment, said stationary vanes and/or the rotor blades are configured individually adjustable within each stage, in terms of at least dimensions, alignment and spatial disposition thereof, during the operation of the apparatus.

In embodiment, the apparatus further comprises a housing configured to enclose the central shaft and the at least one stage.

In embodiment, the apparatus is configured as a modular structure, wherein the housing is established by number of modules disposed one after another. The apparatus is further configured to comprise at least one non-exhaust module and an exhaust module.

In embodiment, the exhaust module comprises an at least one exit line for process fluid discharge arranged in circumferential direction with regard to a horizontal axis of the apparatus defined by the central shaft, and in which exhaust module the mixing space is an exhaust mixing space provided inside the exit line. Said exhaust module can further comprise an at least one additional component including, but not limited to an injection port, a pipe, a manifold, and the like.

In some embodiment, in the abovementioned modular structure the stage is established by the at least one module.

In embodiment, the apparatus is further configured to comprise an inlet module disposed most upstream in a direction of fluid flow and configured to receive a feedstock-containing process fluid via an at least one intake line arranged in a circumferential direction with regard to a horizontal axis of the apparatus defined by the central shaft.

In embodiment, the stage is established by the inlet module and the exhaust module.

In embodiment, the number of modules within the modular structure is adjustable by addition, replacement and/or removal of the at least one non-exhaust module provided between the inlet module and the exhaust module.

In embodiment, the housing of the apparatus is configured to closely adjoin the stationary vanes, the axial-radial rotor blades and the mixing space.

In further embodiment, the housing further comprises an upper portion and a lower portion as viewed along a horizontal cross section of the apparatus, and wherein said upper portion is configured to encompass at least the bend section of the channel forming the mixing space within each module.

In embodiment, said upper portion is further configured to encompass at least a part of the return channel section.

In embodiment, said upper portion of the housing, within each individual module, is configured detachable and replaceable.

In embodiment, in said apparatus, the housing can be further configured with walls having thickness of at most 30 mm, preferably, within a range of 5-20 mm.

In embodiment, the the apparatus is configured with a number of catalytic surfaces.

In embodiment, in said apparatus, each process stage and/or each module is established, in terms of its' structure and/or controllability over the operation thereof, independently from the other stages and/or modules.

In embodiment, the apparatus further comprises an additional facility, such as a refinery- and/or a heat exchanger facility, connectable to the at least one non-exhaust module disposed between the inlet module and the exhaust module.

In another aspect, use of said apparatus for thermal- or thermochemical cracking of hydrocarbon-containing feedstock is provided, according to what is defined in the independent claim 35.

In further aspect, an arrangement comprising at least two apparatuses according to some previous aspect is provided, according to what is defined in the independent claim 37.

In still further aspect, a method for conducting chemical reactions in a process fluid is provided, according to what is defined in the independent claim 39.

The utility of the present invention arises from a variety of reasons depending on each particular embodiment thereof. Modular structure of the reactor, according to the present disclosure, allows for provision of tailored solutions customized such, as to meet specific demands of the customer. Thus, the solution disclosed hereby allows for addition and removal, optionally accompanied by replacement, of separate modules within the reactor, thus allows for modifying a number of process stages therewithin. For example, an initially single-stage reactor device can be easily expanded to a structure comprising two- or more stages, in an event if the single-stage structure would turn out being incapable to transfer the required amount of energy in one stage.

In addition to being modular, the present solution is also fully scalable; therefore, the reactor disclosed hereby can be configured for refinement facilities of essentially any size and capacity. By scalability we refer to modifying the size of an individual reactor device (and its capacity, accordingly). The reactor is scalable to a much larger scale in comparison with the existing machines; in general, scalability of the reactor is proportional to its power requirements and/or a shaft/rotor speed.

Provision of the reactor apparatus as a modular solution further allows for acquiring a number of benefits in terms of improving process functionality thereof. In particular, the structure disclosed hereby enables controlling residence times (time that feedstock-containing process fluid spends in the reaction space) with extremely high precision. This is achieved by fine-tuning geometry related and/or three-dimensional configuration parameters of the mixing space(s). The residence time affects the ratio of primary to secondary products at a constant temperature. Thus, with short residence times, primary reactions resulting in formation of the target products (hereby, light olefins) dominate; whereas longer residence times lead to an increase in secondary reactions, resulting in coke formation.

Further control over the residence times can be attained, within each module or a group of modules, by replacing the predetermined portions of the housing. Provision of replaceable modules and/or replaceable portions therewithin allows for facilitating maintenance of the reactor and provides an effective solution for the fouling/coking problem.

In conventional tubular reactors heat is transferred through the tube wall into the fluid (therefore, fundamentally said reactors are heat exchanger devices). In the solution provided hereby the reactor is configured to input energy into the reacting fluid(s)/process fluid(s) internally and directly through aerodynamic actions.

As a result, the present reactor device has a lower surface temperature than the maximum temperature in the reacting fluids. This on one hand reduces the maximum temperature in the reactor, and on the other hand reduces the chance for coke to form and to deposit on solid surfaces of the reactor.

The present solution allows for attaining a significantly lower surface temperature and a lower temperature difference in the process fluid in comparison to conventional reactor devices. Thus, the reactor apparatus presented hereby allows for controlling the fluid temperature, whereby temperature uniformity can be improved and the temperature difference can be reduced, accordingly.

The energy input to the reacting fluids is further highly controllable.

In exemplary configurations the reactor according to the present disclosure is advantageously provided as a high-flowthrough rate reactor with the capacity within a range of 1-100 kg/s. As mentioned above, the solution presented hereby is fully scalable; therefore, capacity of the reactor largely depends on its size. Exemplary ranges include 10-15 kg/s, 25-50 kg/s, or 75-100 kg/s. In fact, the reactor can be configured such, as to achieved a capacity value exceeding 100 kg/s; however, rescaling the apparatus to a larger size and/or volume may be, in some instances, restricted by its power- and speed requirements, as well as by cost-effectivity considerations.

The following advantages of the present solution with regard to conventional machines, e.g. axial and toroidal solutions, can be further identified:

improved work input capability (about 400% as compared to the prior art solutions);

compactness (lower manufacturing costs);

flow mixing between stages is avoided;

residence times, pressure and temperature, that altogether contribute to yield, are controllable with high precision at each stage. None of the existing concepts allows for controlling the above mentioned three parameters all together;

circumferential uniformity in temperature distribution, clearance is smaller; coking is reduced.

The terms "pyrolysis" and "cracking" are utilized in this disclosure largely as synonyms regarding the process of thermal degradation of heavier hydrocarbon-containing compounds to lighter hydrocarbon-containing compounds.

The expression "a number of" refers hereby to any positive integer starting from one (1), e.g. to one, two, or three. The expression "a plurality of" refers hereby to any positive integer starting from two (2), e.g. to two, three, or four.

The terms "first" and "second", are used hereby to merely distinguish an element from another element without indicating any particular order or importance, unless explicitly stated otherwise.

The terms "fluid" and "process fluid" refer, in the present disclosure, largely to a gaseous matter, such as e.g. gaseous feedstock stream guided through the interior of the reactor apparatus, preferably, in the presence of diluent.

The term "gasified" is utilized herein to indicate matter being converted into a gaseous form by any possible means.

The term "hydrodynamic" is utilized herein to indicate the dynamics of fluids, which are, in this disclosure, largely represented by gases. Therefore said term is utilized in this disclosure as a synonym to the term "aerodynamic".

Different embodiments of the present invention will become apparent by consideration of the detailed description and accompanying drawings.

DETAILED DESCRIPTION OF THE EMBODIMENTS

Figure 1A:
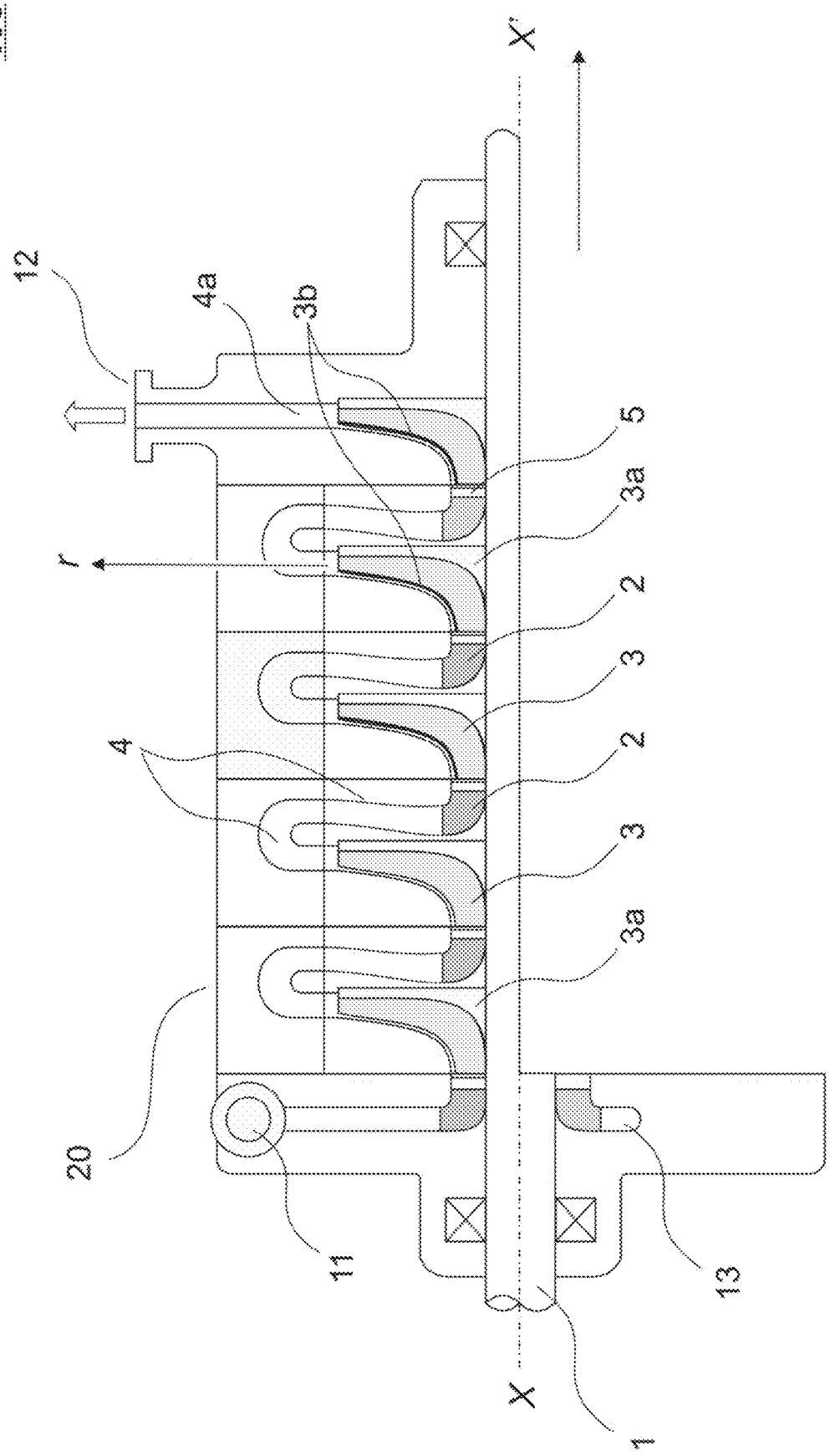
FIGS. 1A and 1B illustrate an apparatus 100 in accordance with some embodiment.

Detailed embodiments of the present invention are disclosed herein with the reference to accompanying drawings. The same reference characters are used throughout the drawings to refer to same members.

Figure 2A:
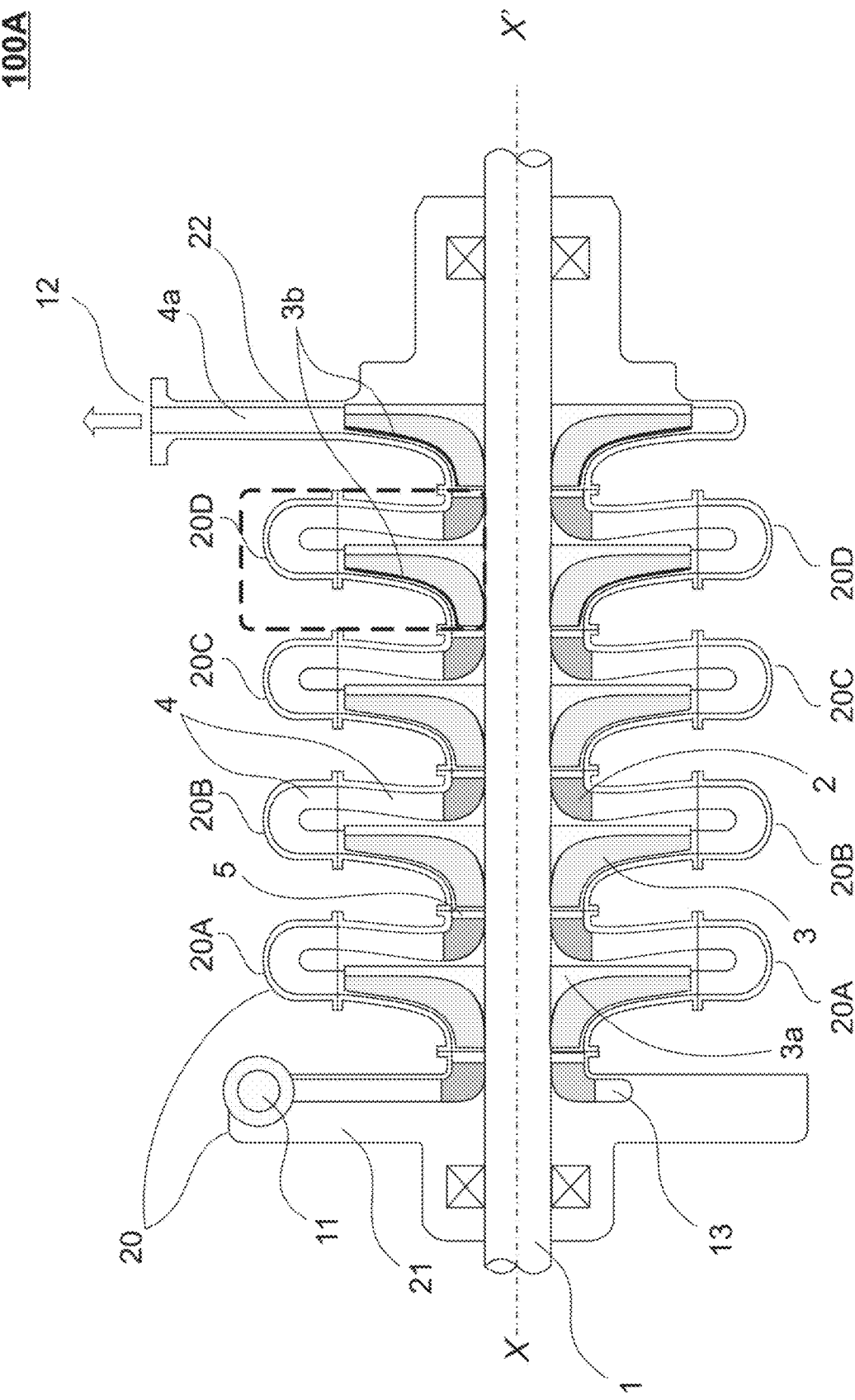
FIGS. 2A and 2B illustrate an apparatus 100A in accordance with some other embodiments.

FIGS. 1A and 2A illustrate at 100, 100A a concept underlying various embodiments of a reactor apparatus for conducting chemical reactions in a process fluid, hereafter, the reactor, in accordance with various embodiments.

The reactor 100, 100A is configured as a radial turbomachine that generally follows a design for centrifugal compressors or centrifugal pumps. The term "centrifugal" implies that fluid flow within the device is radial; therefore, the apparatus may be referred, in the present disclosure, as a "radial-flow apparatus".

The reactor 100, 100A is configured for conducting at least one chemical reaction in a process fluid. In some exemplary embodiments, the reactor is configured for thermal- or thermochemical conversion of hydrocarbon-containing feedstock, in particular, fluidized hydrocarbon-containing feedstock. By "hydrocarbon-containing feedstock" we refer hereby to fluidized organic feedstock matter that primarily comprises carbon- and hydrogen. In some instances, however, the reactor can be configured to process oxygen-containing feedstock matter, such as oxygen-containing hydrocarbon derivatives, cellulose-based feedstock and/or vegetable oil-based feedstocks. Applicability of the reactor proposed hereby thus extends beyond the limits imposed by conventional definition of hydrocarbon feedstocks.

The reactor 100, 100A is configured to process gasified feedstock, wherein the process fluid is provided in gaseous form. In alternative configurations, processing of essentially liquid feedstock matter is not excluded.

In pyrolysis reactions feedstock typically contains diluent(s), to improve product yields. The reactor 100, 100A is advantageously configured to receive feedstock diluted by an at least one diluent, preferably a gaseous diluent, such as (water) steam, nitrogen ($N_2$) or argon, for example. In some instances the diluent is an inert gaseous medium (e.g. nitrogen, argon) that possesses essentially zero reactivity towards the reactants and the reaction products Any other suitable diluent, preferably, a gaseous diluent can be utilized. Hence, the process fluid propagated through the device 100, 100A comprises said at least one diluent.

The reactor 100, 100A thus comprises a central shaft 1 disposed along a horizontal (longitudinal) axis (X-X'; process fluid flow along the horizontal axis is indicated by arrow), and a number of rotor units, hereafter, rotors, mounted onto said shaft 1. In some configurations, the reactor comprises an at least one rotor; in preferred configurations, the reactor comprises two- or more rotors mounted onto the central shaft in sequential order (one after another).

The reactor 100, 100A further comprises at least one driver unit (not shown), such as an electric motor, a steam turbine or a gas turbine, configured to rotate the shaft and the rotors mounted thereonto.

Each said rotor unit comprises a plurality of rotor blades 3 arranged over the circumference of a disk 3a mounted onto the central shaft 1. Together, said plurality of rotor blades arranged on the disk establishes a rotor blade assembly or a rotor blade cascade. Said rotor blades 3 can be configured as axial-radial rotor blades; alternatively, the rotor blades can be configured as mainly radial rotor blades. The definition of axial-radial rotor blades can be explained as follows. As shown on FIG. 4, the process fluid enters the rotor axially in an essentially horizontal direction X-X' (with or without tangential swirls) and leaves the rotor predominantly in a direction which is, when viewed on a meridional plane, mostly radial (i.e. radially outwards from the horizontal axis X-X' defined by the central shaft of the device). Meridional view (two-dimensional) is shown as a horizontal crosscut through the reactor 100, 100A. A mainly radial rotor blade is illustrated on FIG. 6C. On the whole, the rotor blades 3 are high loading centrifugal impeller blades for high stage work input. The rotor can be configured to contain splitter blades, which further enhance the work input capability. Rotors with splitter blades are described further below with reference to FIG. 6B.

The reactor 100, 100A further comprises a plurality of stationary (stator) vanes 2 disposed upstream of the rotor. Together said plurality of stationary vanes establishes a stator vane cascade (a stator), provided as an essentially annular assembly upstream of the rotor.

In preferred configurations, the reactor 100, 100A further comprises a mixing space 4 disposed downstream of the rotor.

The terms "upstream" and "downstream" refer hereby to spatial and/or functional arrangement of structural parts or components with relation to a predetermined part- or component, hereby, the rotor, in a direction of process fluid flow throughout the reactor (along the axis X-X', FIGS. 1A, 2A).

The stationary vanes 2 are advantageously provided as (inlet) guiding vanes (IGV) configured, in terms of profiles, dimensions and disposition thereof around the central shaft, to direct the process fluid flow into the rotor in a predetermined direction such, as to control and, in some instances, to maximize the rotor-specific work input capability. Provided as a stationary structure, the stator 2 does not add energy to the process fluid. However, the stator vanes are configured in such a way, as to add necessary/required pre-swirl to the process fluid and to allow the rotor maximizing (mechanical) energy input into said process fluid. This is attained by dimensioning the stator vanes such, as to force the process fluid to enter the rotor at predetermined and required (by process parameters, for example) angle and velocity. The angle at which the fluid enters the rotor blades (an inlet angle) is the most essential parameter hereby, since on that it depends, how much energy the rotor 3 (disposed downstream of the stator 2) will impart to the fluid.

Figure 4:
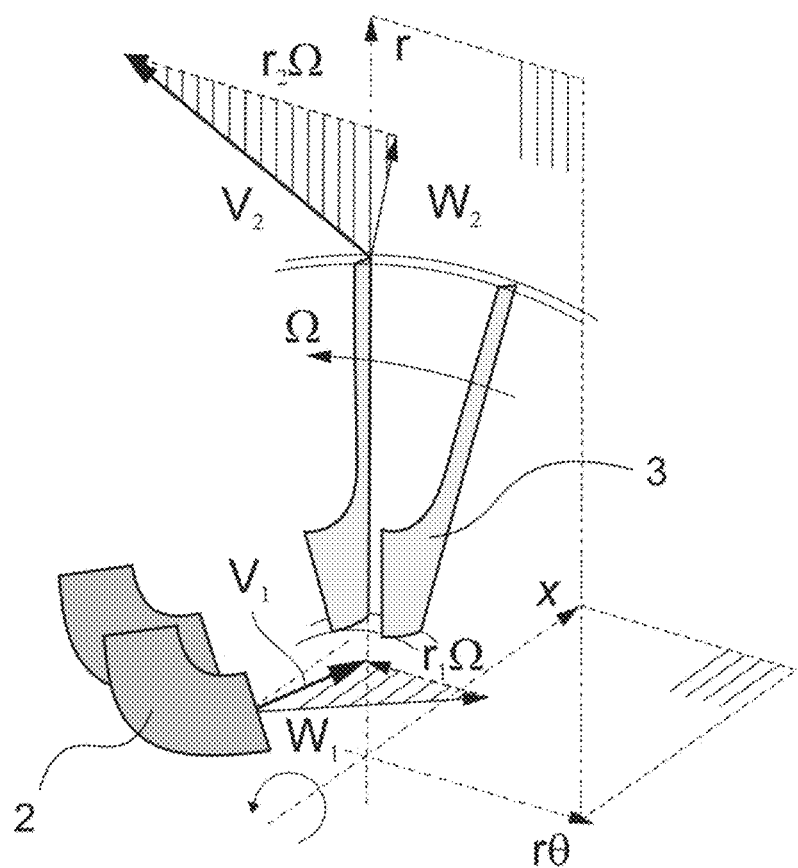
FIG. 4 is a partial view through a crosscut showing stationary- and rotor-related elements within the apparatus, according to some embodiments. Rotation direction, angular ($\Omega$, $\omega$) and tangential velocities at inlet ($r_1\omega$) and exit ($r_2\omega$) are indicated.

The stationary vanes 2 are further configured such, as to direct the process fluid flow into the rotor in a direction essentially along a meridional axisymmetric plane X-r (FIGS. 1A, 4).

Process fluid flow thus enters the plurality of rotor blades 3 in the essentially axial direction (shown by arrow along the plane X-X', FIGS. 1A, 2A). The axial-radial rotor blades 3 are further configured, upon rotation of the rotor, to receive said essentially axial process fluid flow from the stationary vanes 2 and to further turn said flow into an essentially radial direction (FIG. 4), thus imparting mechanical energy to the process fluid by increasing tangential velocity (circumferential speed) thereof. Increase in tangential velocity thus results in an increase of kinetic energy of the fluid, accordingly.

Reference is made to FIG. 4, showing an arrangement of the stator vanes 2 and the rotor blades 3 with regard to one another. Direction of rotation of the rotor around the horizontal axis (X) is indicated by the arrow. Angular velocity of the rotor is indicated by $\Omega$ ($\omega$, omega); whereas tangential velocity or circumferential speed of the blade equals r $\omega$, wherein r is a radius of the rotor. FIG. 4 shows vector triangles for the fluid flow entering the rotor ($r_1$ $\omega$, $V_1$, $W_1$) and for the same exiting the rotor ($r_2$ $\omega$, $V_2$, $W_2$), wherein vector W is relative (flow) velocity, vector V is absolute (flow) velocity also indicative of flow direction, and wherein:

$$V = W + (r\ \omega)$$

From FIG. 4 one may observe that essentially axial fluid flow ($V_1$) that exits the stator 2 and enters the rotor 3, is further guided by the rotor blades, upon rotation of said rotor, radially outwards from the horizontal axis (X) defined by the central shaft of the device ($V_2$; flow exiting the rotor blades). The term "radial" or "radially" is utilized in the present disclosure to indicate direction(s) essentially orthogonal to the horizontal (longitudinal) axis (X) of the device 100 defined by the central shaft 1.

In some instances, circumferential speed of the rotor blades is adapted to be at least 150 m/s. In some instances said circumferential speed can be adjusted to a range between 150-350 m/s. Decreasing the circumferential speed below the rate of 150 m/s is not desired, since the rotor load capacity is then too low.

Hereby, the rotor is configured, in terms of profiles and dimensions of the rotor blades and disposition thereof on the disk, to maximize mechanical energy input to the process fluid.

In some instances, it is preferred that the at least one rotor further comprises a shroud 3b configured to cover the plurality of the rotor blades 3. Unshrouded rotors tend to be less efficient due to high losses associated with the leakage flow (flow that "leaks" over the uncovered rotating blades), in some instances, the reverse leakage flow. Rotor cover, such as the shroud 3b, effectively prevents or at least minimizes such leakage. Additionally, the shroud prevents fluid backflow and detrimental flow mixing that may otherwise occur between the stages.

In some instances, it is preferred that the same apparatus 100, 100A comprises both shrouded and unshrouded rotors. Unshrouded rotors allow for operating the rotor at higher rotational speed, whereby, a configuration with a number of unshrouded rotors followed by a number of shrouded rotors may be beneficial, in terms of adjusting reaction conditions', in "multirotor" configurations (e.g. comprising at least five rotors sequentially arranged on a central shaft).

While the rotor is configured to impart mechanical energy to the process fluid, the mixing space 4 located downstream of the rotor is further configured to convert mechanical energy of the process fluid into internal energy of said process fluid. In the mixing space 4 the high speed fluid flow arriving from the rotor is diffused with the significant entropy increase, whereby the flow dissipates kinetic energy into the internal energy of the reacting (process) fluids, thus providing the thermal energy required for breaking down chemical bonds between long carbon—hydrogen (C—H) chains. An increase in the internal energy of the fluid results in a rise of fluid temperature. Therefore, high molecular weight compounds occurring in the process fluid are effectively size-reduced.

On the contrary, in conventional tubular reactors mechanical energy is converted into heat and transferred through the tube wall. Fundamentally, said conventional tubular reactor is a heat exchanger device. However, the present apparatus 100, 100A is configured to add energy directly to the molecules. Mechanical energy thus dissipates through the aerodynamics actions.

In the reactor 100, 100A, the plurality of stationary vanes 2 (upstream of the rotor), the plurality of axial-radial rotor blades 3 and the mixing space 4 thus establish a process stage (hereafter, the stage), configured to mediate a complete energy conversion cycle. During the energy conversion cycle mechanical energy of the fluid is converted into kinetic energy and further—into internal energy of the fluid, followed by the rise of fluid temperature and occurrence of chemical reactions in said fluid.

Figure 1B:
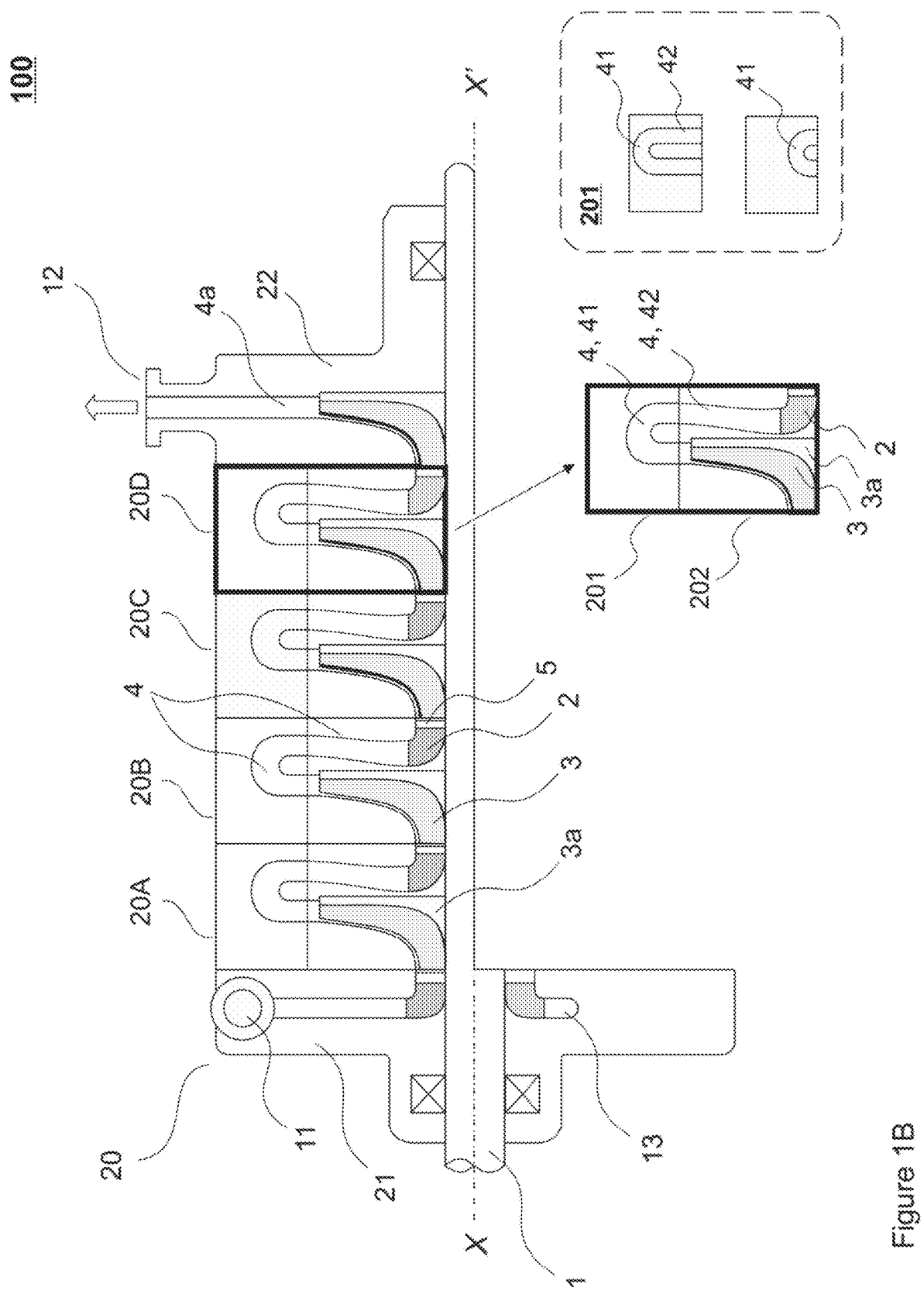
Figure 2B:
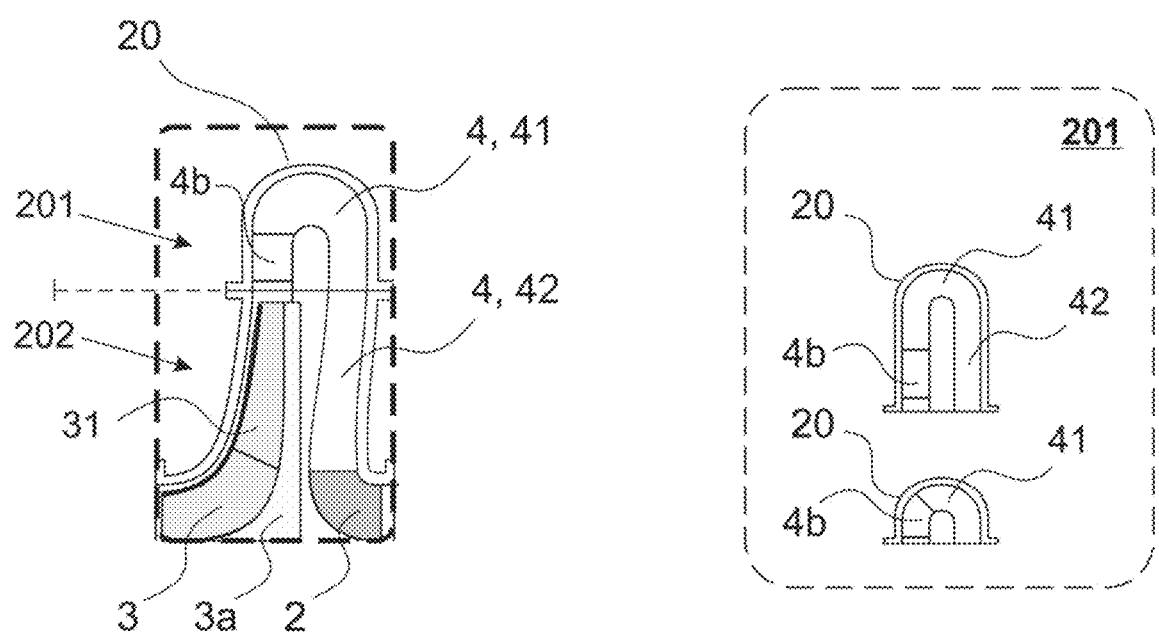

With reference to FIGS. 1B and 2B, the mixing space is hereby established by a conduit comprising at least a bend section 41 followed by a return channel section 42. Within each stage, said mixing space 4 is configured adjustable in terms of its geometry and/or dimensional parameters. Thus, any one of the bend section 41 and the return channel section 42 within the mixing space 4 are adjustable in terms of at least shape, length, cross-section and its spatial disposition within the apparatus 100, 100A.

The bend section 41 is advantageously provided as a U-bend; however, other configurations, such as an S-shaped bend, for example, are not excluded.

By varying the aforesaid parameters of the mixing space 4, residence times (times that the process flow spends in each mixing space) and reaction yield can be controlled with high precision. For example, increasing length and/or diameter of the bend section 41 and/or the return channel section 42 allows for maximizing and/or accelerating entropy increase of the process fluid, which, in turn, creates conditions for quick transfer of mechanical energy of rotor to the fluid. The mixing space 4 thus establishes a reaction space, in where chemical reaction(s) primarily occur.

The mixing space 4 further comprises at least one additional component including, but not limited to a stationary vane or vanes to control the absolute flow direction, a turbulence enhancement device (a turbulator device), a throttle device, a gauze, a flow guide, slots and insertable and/or removable components, and the like (not shown). The additional components can be beneficial in terms of maximizing entropy increase of the process fluid. Mentioned additional components further allow for additional adjustability of the mixing spaces, also during operation of the reactor.

Figures 6A, 6B:
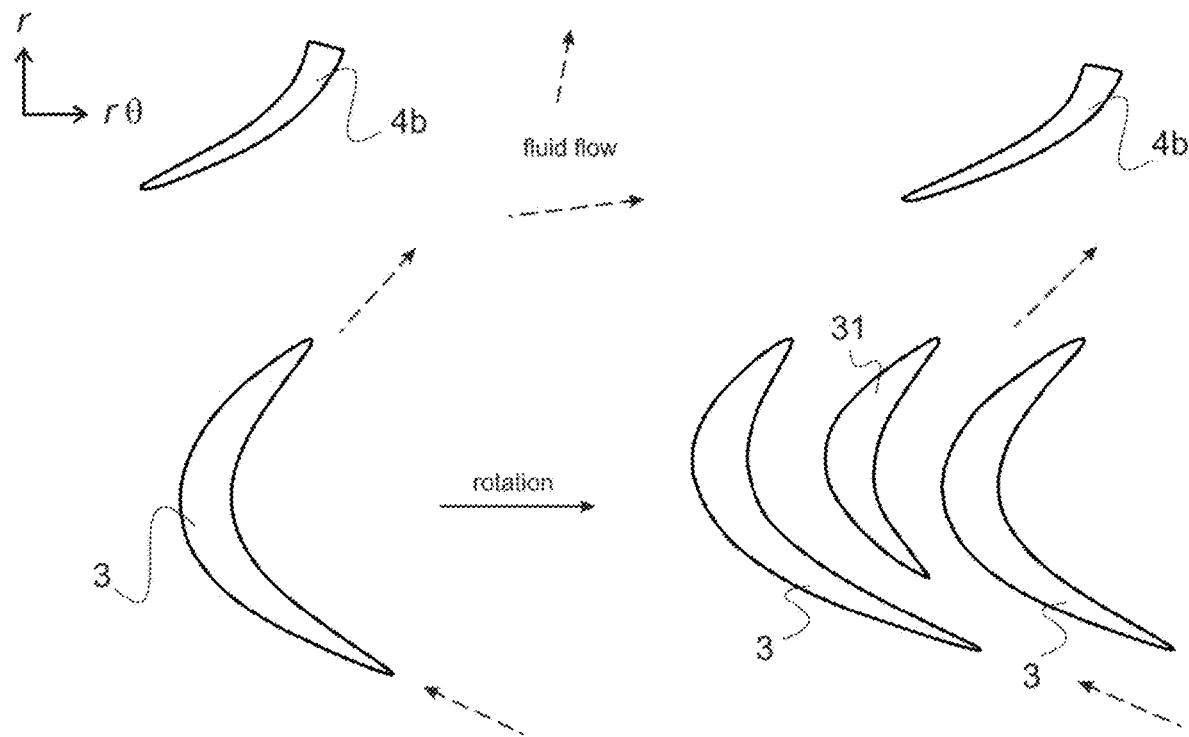
FIGS. 6A and 6B schematically illustrate exemplary configurations for stationary- and rotor-related elements.

In some configurations, the device 100, 100A comprises a diffuser 4b, as illustrated on FIG. 2B and FIGS. 6A and 6B. The diffuser is advantageously disposed downstream of the rotor 3, within the mixing space 4, in the bend section 41 and/or in at least a portion of the return channel section 42. The diffuser can be configured as a vaned diffuser comprising a plurality of stationary vanes 4b, also referred to exit guide vanes (FIGS. 6A, 6B), or as a vaneless diffuser. Stationary diffuser vanes can be disposed directly on the wall that defines an interior of the mixing space and/or connected thereto by means of the auxiliary arrangements, such as rings, brackets, and the like.

FIGS. 6A and 6B schematically illustrate exemplary configurations for the rotor blades 3 and the stationary vanes 4b (diffuser vanes) disposed downstream of the rotor, and their arrangement with regard to one another. Exemplary operating parameters for the rotor shown on FIGS. 6A and 6B are summarized in Table 1 below.

TABLE 1

Exemplary operating parameters for the rotor 3 (FIGS. 6A, 6B).

| | |
|---|---|
| Radial speed range at the rotor blade inlet* | 215 m/s-265 m/s |
| Speed range at the rotor blade exit* | 300 m/s-380 m/s |
| Radial stage specific work input (feedstock specific enthalpy raise per stage) | 240 kJ/kg-450 kJ/kg |
| Rotor exit diameter for a through flow mass flow rate | 180-250 ton/hour |
| Outside diameter (OD) | about 1.0 m |
| Range of negative pre-swirl at the rotor blade inlet | 40 to about 55 degrees |
| Geometric or metal angle at the rotor blade inlet | about 62 degrees |
| Forward sweep angle at the rotor blade exit | about 45 degrees |

*wherein the inlet (a leading edge) and the exit (a trailing edge) are defined in the direction of fluid flow (approximated fluid flow directions are indicated on FIGS. 6A, 6B by dashed arrows; direction of rotation of the rotor is shown by a solid horizontal arrow).

FIG. 6B shows an alternative configuration for the rotor passage, comprising a plurality of splitter blades 31 alternating with main rotor blades 3. The splitter blades 31 are configured to reduce blade loading in the rear part of the blade and to enhance the work input and throughflow capacities. In exemplary configurations, typical number of the rotor blades is 64 (32 main blades+32 splitter blades).

The rotor blades can be configured such, as to established a choked flow mode in the rotor inlet, whereby the flow capacity can be accurately controlled. In majority of operation conditions, choking is also obtained in the stator vane inlet, whereby the absolute flow capacity of the stator can be controlled by a raise of the actual stagnation pressure through the rotor (taking into account the losses in the vaneless mixing space 4). Choked flow mode is hereby a mode associated with a limited flow capacity at the inlet of a blade row where the flow velocity is supersonic.

Figure 6C:
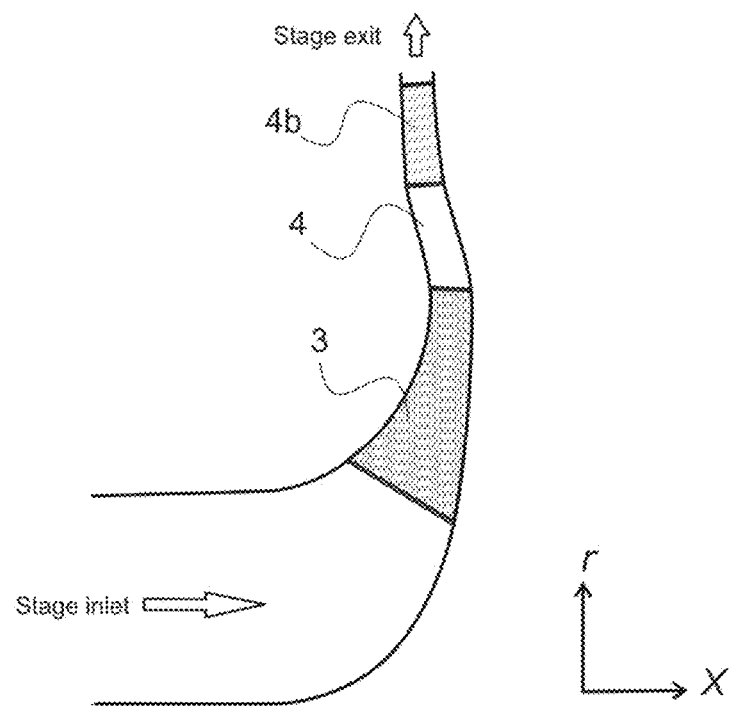
FIG. 6C schematically illustrates an exemplary process stage of the apparatus, according to some embodiment.

FIG. 6C schematically illustrates a meridional view of the process stage (inlet flow swirler is not shown). Stage inlet and stage exit are marked by arrows. FIG. 6C thus shows the rotor 3 and the part of the mixing space 4 where the diffuser vanes (exit guide vanes) 4b locate. Vaneless space within the mixing space 4 allows for mixing. Stage design as shown on FIG. 6C has nominal flow rate of 60 kg/s, which is equivelant to 216 tons of feedstock per hour.

As can be viewed from FIG. 6C, a relatively large vaneless space (4) is set between the trailing edge of the rotor blade 3 and the leading edge of the stationary exit guide vane 4b to allow for additional mixing of the fluidic flow, whereby stagnation pressure is reduced.

The dimensions, alignment and spatial disposition of the stationary vanes 2 (upstream of the rotor), the rotor blades 3 and/or the stationary vanes 4b (downstream of the rotor) are prefereably individually adjustable within each stage by design (by manufacturing) or by operation. Thus, the stationary vanes and/or the rotor blades can vary within each stage in terms of at least dimensions, alignment and spatial disposition thereof, as preset (set up prior to and/or during operation) or as manufactured. In addition to being variable from stage to stage, said stationary vanes and/or rotor blades can be configured fixed (non-adjustable) and individually adjustable during the operation of the device.

Heating of the process fluid in the reactor 100, 100A to a desired temperature, such as 900 or 1000 degree Celsius is preferably conducted within two or three initial stages. Thereafter temperature is maintained essentially constant till the exit (discharge).

The apparatus 100, 100A further comprises a casing or a housing 20 with an at least one inlet 11 and an at least one exit 12. The housing 20 is configured to enclose the central shaft 1 and at least one stage.

In the configuration shown on FIG. 1A, the housing 20 has an essentially constant cross-section along its entire length.

Some supplementary configurations of the device embodied at 100 include provision of the housing in the form of a (truncated) cone (not shown).

In the configuration shown on FIG. 2A, the housing 20 is provided as a confined space that encompasses (closely adjoin) the stationary vanes, the axial-radial rotor blades and the mixing space forming at least one the process stage. The interior and optionally the external shape of said housing is configured to essentially follow the shape of the elements constituting said process stage. Hence, in some instances, the housing 20 has a variable cross-sectional areas across its interior (FIG. 2A).

A reference is made to FIGS. 1B, 2A that show the reactor 100, 100A configured as a modular structure, in which the housing 20 is established by number of modules 20A, 20B, 20C, 20D disposed one after another. Configurations shown on FIGS. 1B, 2A are exemplary in terms of the number and arrangement of the modules, as the latter may vary depending on a particular implementation of the reactor 100, 100A.

The reactor 100, 100A is further configured such, as to comprise an at least one non-exhaust module and an exhaust module. By the non-exhaust modules we refer, hereby, to structural entities that allow for circulation of the process fluid flow from the upstream to downstream. The exhaust module is the module, via which the product-containing fluid flow is discharged from the reactor 100, 100A.

The exhaust module 22 comprises an at least one exit line 12, configured as a tube or a pipe, for example, for product-containing process fluid discharge, said line 12 arranged in a circumferential direction with regard to the horizontal axis (X-X') defined by the central shaft. On FIGS. 1A, 2A the exit line 12 is arranged in an essentially vertical direction with regard to the horizontal axis X-X'.

Figure 3:
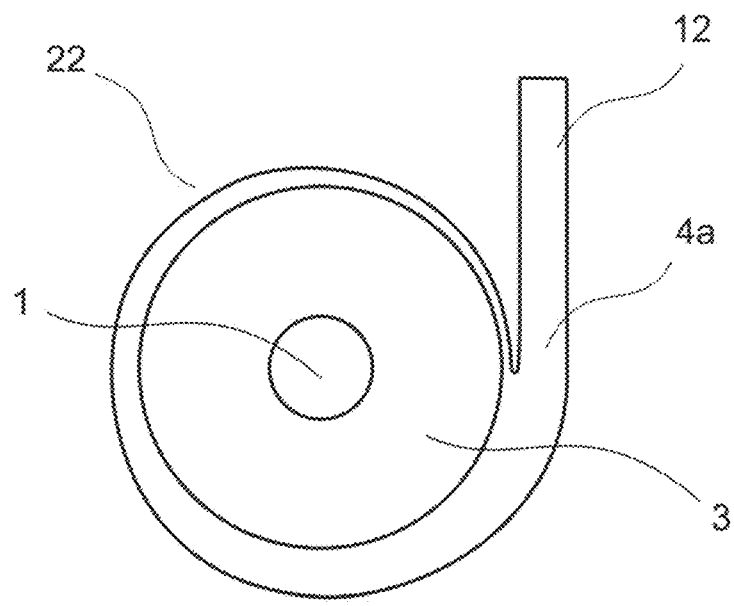
FIG. 3 is a cross-sectional view of an exhaust module of the apparatus, according to some embodiments.

The exhaust module 22 contains a rotor 3 and a mixing space configured as an exhaust mixing space 4a provided inside the exit line 12. Cross-sectional view for the exhaust module 22 is provided by FIG. 3. Said exhaust module 22 further comprises an at least one additional component configured for injection and/or withdrawal of fluid, such as a port, a pipe, a manifold and the like (not shown).

The reactor 100, 100A further comprises an inlet module 21 disposed most upstream in a direction of the process fluid flow. In most instances said inlet module is provided as a first module in a sequence. The inlet module 21 is configured to receive a feedstock-containing process fluid via at least one intake line 11 (the inlet) arranged in a circumferential direction with regard to the horizontal axis X-X'.

The inlet module can further comprise an additional inlet port 13, such as a scroll inlet to produce highly swirled flow to the rotor.

In some instances the reactor 100, 100A is configured as a single-stage apparatus. In such an event the stage is established by the inlet module 21 and the exhaust module 22.

However, if the required amount of energy cannot be transferred in one stage, then a multistage device is required. In such an event, the reactor 100, 100A is configured as a multistage modular structure, in which the stage is established by the at least one non-exhaust module (20A, 20B, 20C, 20D, etc.). The multistage reactor can be established by at least two stages. In some instances, the multistage apparatus may comprise at least one stage established by the non-exhaust module 20A (20B, 20C, 20D), the inlet module 21 and the exit (exhaust) module 22. For a person skilled in the art it is clear that the reactor 100, 100A can be implemented with a number of non-exhaust modules exceeding that shown on FIGS. 1B, 2A.

The (non-exhaust) modules 20A, 20B, 20C, 20D disposed between the inlet module 21 and the exit module 22 may be further referred to as central modules.

The reactor 100A, 100A configured in accordance with the embodiments described hereinabove has tolerance for relatively wide variations of design parameters. In particular, a multistage solution can be configured with a number of stages each having different volume flow rate/volume flow capacity. Thus, the work input requirements and/or residence times can be adjusted/regulated separately within each stage.

In all configurations 100, 100A, the mass flow rate is easily adjustable, optionally stage-wise, by changing the rotor size (diameter, quadruple increase) and/or the blade height (linear increase). Variable height for the rotor blades can be achieved by adjusting the axial location of the rotor disc 3a, which allows for changing volume flow rates through the different stages having similar design. By modifying (rotor) blade height in a manner indicated above allows for increasing volume flow capacity through the reactor, as the disc stress will allocate towards the end of the reactive process (i.e. towards the end of the reactor apparatus), where both temperature and work input requirement are the highest.

Since the rotor performance is little affected by the increase of the blade height, the radial flow reactor can be designed with the rotor unit(s) comprising a plurality of main blades with splitter blades (e.g. 32+32 solution), which allows for improved scalability.

The modules 20A, 20B, 20C, 20D, 21, 22 are interconnected by means of at least one bearing 5 optionally combined with associated seal(s) (not shown). The modular structure allows for adjusting the number of modules therewithin by addition, replacement and/or removal of the at least one non-exhaust module provided between the inlet module and the exhaust module.

The central shaft 1 can be further configured in at least two parts joined together by an appropriate coupling, such as a Hirth joint, for example (not shown). Utilization of Hirth gear(s) is particularly beneficial, as coupling elements provided with these gears are self-centering upon (shaft) rotation by their form and by force applied mechanism.

In a number of configurations, the housing 20 further comprises an upper portion and a lower portion as viewed along a horizontal cross-section of the reactor (horizontal split). FIGS. 1B, 2B show, at 20D, the housing comprising the upper portion 201 and the lower portion 202.

Said upper portion 201 is configured to encompass at least the bend section 41 of the channel forming the mixing space 4 within each corresponding stage and/or the module. In some instances, the upper portion 201 can be configured such, as to further encompass at least a part of the return channel section 42 and of the rotor disk.

In a number of configurations, said upper portion 201 of the housing, within each individual module, can be implemented detachable and replaceable. Such an arrangement allows for additional tunability of reaction parameters; moreover, it offers a simple and cost-effective approach for completely resolving a coking problem. For example, FIGS. 1B, 2B (dashed box) show the upper portions 201 of the exemplary module 20D, encompassing the bend section 41 of the mixing space 4. Within the dashed box 201 the lowermost item encompasses merely the bend portion 41 (such as the U-bend, for example), of the mixing space. Accordingly, residence time of the process fluid within the module comprising the aforesaid (upper) portion 201 is reduced.

The uppermost item within the same dashed box 201 (FIGS. 1B, 2B) encompasses the bend section 41 (such as the U-bend, for example) and, additionally, a part of the return channel portion 42, of the mixing space 4. Accordingly, residence time of the process fluid within the module comprising such (upper) portion 201 can be increased.

By replacing the upper portions 201 individually within each module, residence times can be controlled with high precision. Moreover, the arrangement allows for facilitating maintenance or the reactor and/or provides a solution to a fouling/coking problem. Indeed, removal of individual modules and/or parts thereof (e.g. dismantling the upper portions 201 within the individual modules), followed by cleaning and/or replacement, is considerably more simple, fast and cost-effective alternative than service and maintenance of the entire (multistage) device.

The reactor 100, 100A is further configured such as to comprise the housing 20 with walls having thickness of at most 30 mm, preferably, within a range of 5-20 mm.

By having very thin walls, it is easier to achieve or maintain mechanical integrity thereof. Such as thin-walled casing is easier to preheat. Moreover, utilization of thin metal sheets allow for significant reduction of thermal stress, whereby construction and maintenance costs can also be reduced, accordingly.

The concept of the reactor 100, 100A according to the present disclosure allows for controlling (monitoring and adjusting/modifying) with extremely high precision the reaction process related parameters within each individual stage and/or the module thereof. Thus, in the reactor 100, 100A each process stage and/or each module is established, in terms of its' structure and/or controllability over the operation(s) thereof, independently from the other stages and/or modules.

Structural/dimensional adjustability of stationary and rotor-related components within each individual stage, as well as dimensional adjustability of the mixing space within each individual stage and/or module allow for adjusting operative/functional characteristics of the (reaction) process with regard to each individual stage and/or the module. As described hereinabove, by modifying the aforesaid structural components within each stage and/or module, the fluid flow related parameters (volume, velocity, residence times, and the like) can be controlled stage- and/or module-wise with high precision.

Still, the reactor 100, 100A can further comprise a variety of means to establish controllability over pressure and temperature distribution within each stage and/or modules. Thus, the reactor can comprise means for pressure relief (pressure loss elements) in each individual stage or in a number of selected stages, advantageously placed within each mixing space 4 (preferably, into the return channel sections 42). The latter allows for operating the reactor 100, 100A at low (atmospheric) pressure that equals 1,01325 bar (absolute, abs) or at a vacuum range from 1 to 0 bar abs.

The mixing space(s) 4 as described hereinabove can be configured to maintain pressure at the required level throughout the stages. This allows for e.g. for attaining large pressure variations throughout the reactor 100, 100A, as compared to the axial solutions, for example.

By controlling pressure drop and temperature, the reaction yield can be managed with better controllability.

Overall, by adjusting the mixing spaces 4 in terms of various structural parameters, in particular, cross-section/mixing area and length/volume, controllability of residence times, pressure and temperature is markedly improved. The above mentioned mixing spaces related parameters can be changed independently. Short residence times, low pressure and high temperature (all controllable at each stage) efficiently contribute to high conversion and yield and reduce coking.

Moreover, the reactor 100, 100A can further comprise means for adjusting pressure across the rotor in all stages or in a number of selected stages, accordingly (not shown).

In some configurations, the reactor 100, 100A can further comprise means for increasing pressure (not shown) in particular process stage(s). For example, by increasing pressure in the final process stage (e.g. in the non-exhaust module disposed directly upstream the exhaust module and/or in the exhaust module) to a predetermined value, residence times in said last process stage can be minimized, whereby the yield could be increased, accordingly. Thus, provision of high pressure at said final stage accounts for significant reduction in volumetric flow, which allows for downsizing the downstream equipment (e.g. cooling equipment) accordingly. Associated savings may largely affect capital investment.

In some instances, increase of pressure to 2-4 bar abs is preferred; however, adjustment of the pressure value largely depends on the desired yield. Pressure increase is preferably implemented at an essentially constant temperature.

In view of thermodynamics, it is preferred to conduct pyrolysis reactions for producing light olefins at low pressure, at which undesired condensation processes are disadvantaged. For this reason, conventional tubular furnaces operate at nearly atmospheric pressure at the exit. However, due to an absence of tools for effective pressure control in conventional hydrocarbon cracking furnaces, operation at such a low pressure (atmospheric) throughout the entire reactor apparatus has not been yet possible. The current solution allows inter alia for improved flexibility in adjusting pressure parameters throughout the entire reactor apparatus.

In similar manner, partial pressure of hydrocarbons can be adjusted stage-wise by provision of a diluent injection means (ports, valves, vents, and the like) within each stage and/or module. As the diluent content increases, the hydrocarbon partial pressure is reduced, accordingly, that accounts for improved yield of the target product(s), such as light olefin(s), and for diminished coke deposits. For example, it has been demonstrated and acknowledged that upon reducing partial pressure (e.g. from 30 psia or about 207 kPa to 10 psia or about 69 kPa) the maximum hydrocarbon product yield can be markedly improved at essentially high (about 80%) conversion rates.

In addition to diluents, injection of feedstocks and/or other reagents can be implemented with regard to each individual stage and/or module, in order to optimize reaction yields.

Figure 5:
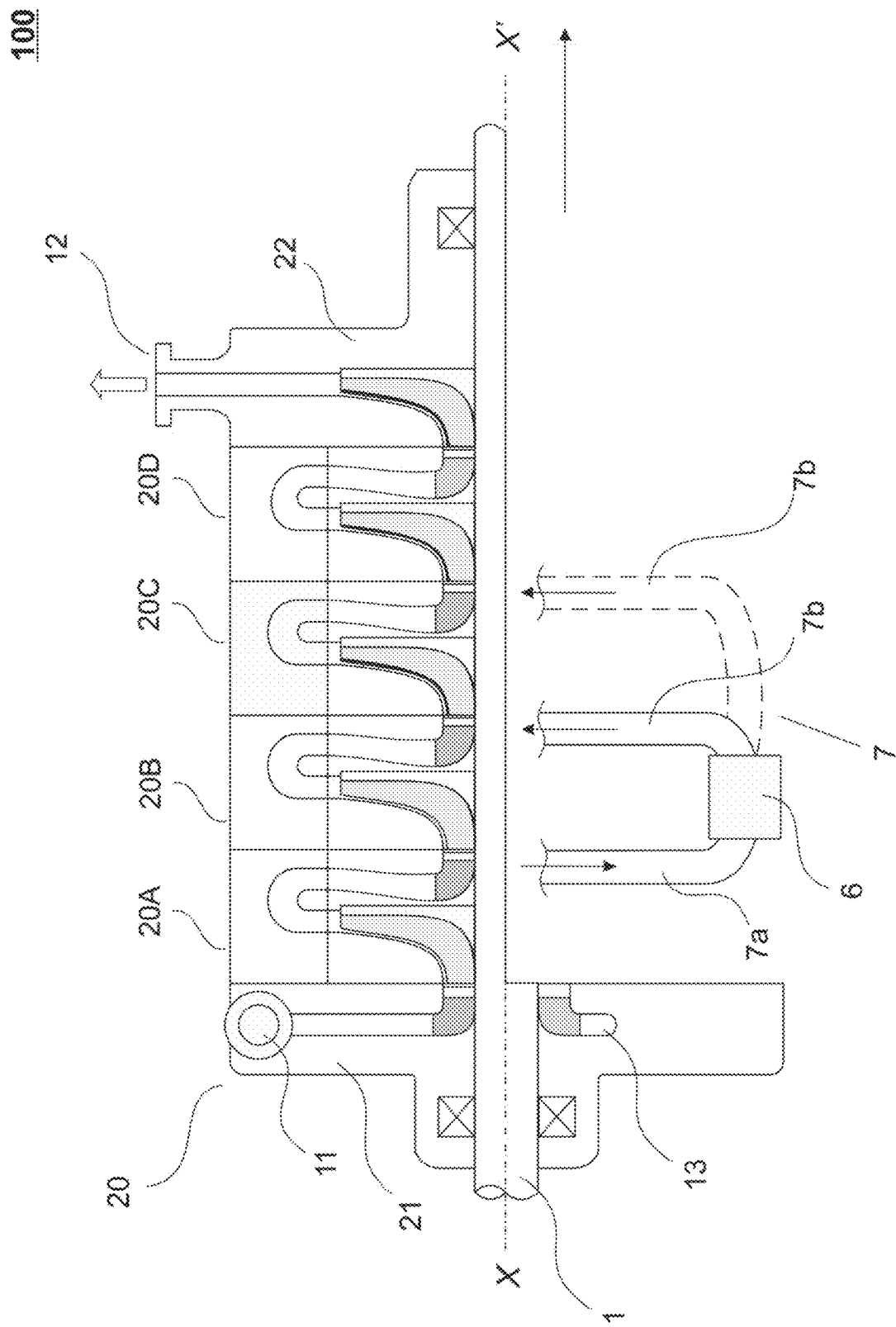
FIG. 5 shows an embodiment of the apparatus that further comprises an additional facility, such as a cooling system.

A reference is further made to FIG. 5 showing the exemplary reactor apparatus 100 comprising an additional refinery- and/or a heat exchanger facility 6. It should be made clear that the device embodied at 100A can also comprise the same facility. The additional facility 6 is preferably connectable to the at least one (central) non-exhaust module 20A, 20B, 20C, 20D provided between the inlet module 21 and the exhaust module 22 by a manifold/a piping arrangement 7. Said manifold comprises at least one line configured as a conduit arm 7a, for example, for withdrawal of the process fluid from the reactor and for guiding said process fluid into the facility 6, and at least one line 7b for guiding the process fluid back into the reactor.

In some embodiments, the additional facility 6 is configured as a heat exchanger facility that cools down the process fluid guided thereinto via the at least one conduit 7a. By way of example, the facility 6 can be arranged to cool the process fluid heated to 900-1000 degree Celsius to about 700 degree Celsius. Cooled fluid is further directed into the reactor via the conduit 7b. Cooling of the process at essentially a "midpoint" of the reaction allows for further optimization of the reaction yields.

The above mentioned arrangement is particularly advantageous for conducting thermal degradation of biomass-derived feedstocks.

In some other embodiments, the additional facility 6 can be configured as a refinery facility configured for hydrogen extraction and/or recovery, for example. In such a case, the incoming process fluid (i.e. the process fluid extracted from the device 100, 100A) is subjected to a dehydrogenation treatment or a series of treatments, followed by directing the dehydrogenated fluid back into the device via the piping 7b. Such an arrangement allows for further recovery of hydrogen ($H_2$).

In some embodiments, the facility 6 can be configured such, as to combine the heat exchanger and the hydrogen extraction facility. In fact, the system 6 can further encompass any other extraction and/or refinery facility.

In some instances, the process fluid is extracted and returned into the same non-exhaust module. In some other instances, the process fluid is returned to any non-exhaust module disposed subsequently to the extraction module. It is preferred that both "extraction" and "return" modules are disposed between the inlet module and the exhaust module and/or prior to the last process stage.

It is preferred that the all process fluid is guided into the cooling system 6, thus essentially "emptying" the reactor. However, partial withdrawal of material is not excluded. In either case, an at least one partition can be arranged within the reactor 100, 100A to guide (entirely or partially) the process flow into the cooling system 6 and/or to avoid mixing of the cooled fluid with the heated same.

Upon connecting the at least two reactor apparatuses 100, 100A in parallel or in series, a reactor assembly can be established (not shown). Connection between said apparatuses can be mechanical and/or functional. Functional (in terms of chemistry, for example) connection can be established upon association between at least two individual, physically integrated- or non-integrated individual reactors 100, 100A. In a latter case, association between the at least two apparatuses 100, 100A can be established via a number of auxiliary installations (not shown). In some configurations, the arrangement comprises the at least two apparatuses connected such, as to mirror each other, whereby said at least two apparatuses are at least functionally connected via their central shafts. Such mirrored configuration can be further defined as having the at least two apparatuses 100, 100A mechanically connected in series (in a sequence), whereas functional (e.g. chemical) connection can be viewed as connection in parallel (in arrays).

In some instances, the aforesaid "mirrored" arrangement can be further modified to comprise at least two inlets and a common exhaust (discharge) module placed essentially in the center of the arrangement.

In a further aspect, use of the reactor apparatus 100, 100A is provided for thermal- or thermochemical cracking of hydrocarbon-containing feedstock.

In selected embodiments, the reactor 100, 100A can be configured for executing an at least one procedure selected from the group consisting of: processing hydrocarbon feedstock preferably containing medium and light weight hydrocarbon fractions; processing gasified carbohydrate-containing feedstock matter, processing gasified glyceride- and/or fatty acid-containing feedstock matter, and processing gasified cellulosic biomass material. Hereby, the reactor 100, 100A is configurable for processing oxygen-containing feedstock materials derived from bio-based feedstock, for example. Possible application areas include refining of biomass-based or biomass-derived matter to produce renewable fuels in processes such as direct catalytic hydrogenation of vegetable oil or animal fats into corresponding alkanes, for example. Additionally, the reactor may be configured for valorization (enhancement or refinement of gaseous matter) of bio-based pyrolysis gas or syngas.

In another aspect, a method for conducting chemical reactions in a process fluid is provided, said method comprising at least the following steps:

a. obtaining a reactor apparatus 100, 100A comprising: a central shaft 1 with a number of axial-radial rotors mounted thereon, each said rotor comprises a plurality of axial-radial rotor blades 3 arranged over the circumference of a disk mounted onto the central shaft, a plurality of stationary vanes 2 disposed upstream the rotor, and a mixing space 4 disposed downstream of the rotor, wherein the plurality of stationary vanes 2, the plurality of axial-radial rotor blades 3 and the mixing space 4 establish a process stage;

b. adjusting the rotation speed of the rotor to a predetermined speed or a speed range to reach the process fluid flow rate that satisfies the requirements imposed by the process;

c. adjusting a preheating level of the feedstock containing process fluid; and d. directing a feedstock containing process fluid flow subsequently through the at least one stage such, that in the mixing space mechanical energy imparted to the process fluid by the rotor is converted into internal energy of said process fluid, thus promoting chemical reactions in the process fluid to occur.

By adjusting a preheating level of the feedstock containing process fluid, initiation of the reaction can be controlled with high precision, thus allowing for optimizing the reaction yield and product constituency.

In some embodiments, the feedstock comprises hydrocarbons. In some instances the feestock comprises at least one alkane feed (ethane, propane, butane), naphtha feed, gas oil, and/or any other feed suitable for producing essentially low-molecular weight, preferably unsaturated hydrocarbons, such as olefins (ethylene, propylene, butylene) and acetylene.

It is preferred that the residence times and/or the yield are individually adjustable within each stage by modularly modifying geometry and/or the dimensional parameters of the mixing space 4. As disclosed hereinabove, by such an arrangement fouling/coking can be prevented or at least considerably reduced. Additionally adjusting residence times and work input at particular stages allows for controlling the yield of a particularly preferred product of the reaction.

In further embodiments, the feedstock containing process fluid flow rate is adjustable during the operation. This could be implemented by a variable angle stationary vane setup, for example. Such controllability is particularly important for controlling the processes in ethylene plants.

In some embodiments, the method further comprises increasing pressure in the non-exhaust module disposed upstream the exhaust module and/or in the exhaust module.

In still further embodiments, the method can further comprise withdrawal of the process fluid from the reactor 100, 100A via an at least one fluid withdrawal line 7a and guiding said process fluid into a cooling system 6, in where the process fluid is cooled down, and subsequent guiding of cooled process fluid back into the reactor via an at least one fluid return line 7b.

It is clear to a person skilled in the art that with the advancement of technology the basic ideas of the present invention may be implemented in various ways. The invention and its embodiments may generally vary within the scope of the appended claims.

The invention claimed is:

1. An apparatus for conducting chemical reactions in a process fluid, comprising
a central shaft with a number of axial-radial rotors mounted thereon, each said rotor comprises a plurality of axial-radial rotor blades arranged over a circumference of a disk mounted onto the central shaft,
a plurality of stationary vanes disposed upstream the rotor, and
a mixing space provided as a vaneless and/or vaned mixing space disposed downstream of the rotor,
wherein the mixing space is configured to convert mechanical energy imparted to the process fluid by the rotor into internal energy of said process fluid and to establish conditions for an at least one chemical reaction in the process fluid to occur.

2. The apparatus of claim 1, comprising at least two rotors mounted onto the central shaft one after another.

3. The apparatus of claim 1, wherein the plurality of stationary vanes, the plurality of axial-radial rotor blades and the mixing space establish a process stage, configured to mediate a complete energy conversion cycle, and wherein the apparatus comprises at least one process stage.

4. The apparatus of claim 1, wherein the stationary vanes are inlet guide vanes configured to direct a process fluid flow into the rotor in a predetermined direction to control the specific work input capability of the rotor.

5. The apparatus of claim 1, wherein the stationary vanes are configured to direct the process fluid flow, with a preswirl, into the rotor in a direction essentially along a meridional axisymmetric plane X—r.

6. The apparatus of claim 1, wherein the rotor blades are configured, upon rotation of the rotor, to receive the essentially axial process fluid flow from the stationary vanes and to further turn said flow, with a swirl, into an essentially radial direction, thus imparting mechanical energy to the process fluid by increasing tangential velocity thereof.

7. The apparatus of claim 1, wherein profiles and dimensions of the rotor blades and disposition thereof on the disk are configured to control mechanical energy input to the process fluid.

8. The apparatus of claim 1, wherein the at least one rotor comprises a shroud configured to cover the plurality of the rotor blades.

9. The apparatus of claim 1, wherein the mixing space is configured to convert kinetic energy or mechanical energy of the process fluid into internal energy of said process fluid.

10. The apparatus of claim 3, wherein the mixing space is established by a conduit comprising at least a bend section followed by a return channel section.

11. The apparatus of claim 3, wherein geometry and/or dimensional parameters of the mixing space within each process stage are configured to be adjustable.

12. The apparatus of claim 10, wherein shape, length, cross-section and spatial disposition within the apparatus of any one of the bend section and the return channel section within the mixing space are adjustable.

13. The apparatus of claim 1, wherein the mixing space further comprises an at least one additional component including, but not limited to a stationary vane or vanes, a turbulator device, a throttle device, a gauze, a flow guide, and a slot.

14. The apparatus of claim 1, wherein the mixing space comprises a diffuser.

15. The apparatus of claim 14, wherein said diffuser is vaned or vaneless.

16. The apparatus of claim 3, wherein dimensions, alignment, and spatial disposition of the stationary vanes and/or the rotor blades vary within each process stage as preset or as manufactured.

17. The apparatus of claim 3, wherein, during the operation of the apparatus, dimensions, alignment and spatial disposition of the stationary vanes and/or the rotor blades are individually adjustable within each process stage.

18. The apparatus of claim 10, further comprising a housing configured to enclose the central shaft and the at least one process stage.

19. The apparatus of claim 18, configured as a modular structure, wherein the housing is established by number of modules disposed one after another.

20. The apparatus of claim 19, comprising an at least one non-exhaust module and an exhaust module.

21. The apparatus of claim 20, wherein the exhaust module comprises an at least one exit line for process fluid discharge arranged in circumferential direction with regard to a horizontal axis of the apparatus defined by the central shaft, and in which exhaust module the mixing space is an exhaust mixing space provided inside the exit line.

22. The apparatus of claim 20, wherein the exhaust module further comprises an at least one additional component including, but not limited to an injection port, a pipe, and a manifold.

23. The apparatus of claim 19, wherein, within said modular structure, the at least one process stage is established by the at least one module.

24. The apparatus of claim 20, further comprising an inlet module disposed the most upstream in a direction of fluid flow and configured to receive a feedstock-containing process fluid via an at least one intake line arranged in a circumferential direction with regard to a horizontal axis of the apparatus defined by the central shaft.

25. The apparatus of claim 24, wherein the at least one process stage is established by the inlet module and the exhaust module.

26. The apparatus of claim 24, wherein the number of modules within the modular structure is adjustable by addition, replacement and/or removal of the at least one non-exhaust module provided between the inlet module and the exhaust module.

27. The apparatus of claim 18, wherein an interior of the housing is configured to closely adjoin the stationary vanes, the axial-radial rotor blades and the mixing space.

28. The apparatus of claim 19, wherein the housing further comprises an upper portion and a lower portion as viewed along a horizontal cross section of the apparatus, and wherein said upper portion is configured to encompass at least the bend section of the channel forming the mixing space within each module.

29. The apparatus of claim 28, in which said upper portion is further configured to encompass at least a part of the return channel section.

30. The apparatus of claim 28, wherein said upper portion of the housing, within each individual module, is configured detachable and replaceable.

31. The apparatus of claim 1 of any preceding claim 1, configured with a number of catalytic surfaces.

32. The apparatus of claim 18, wherein the housing is configured with walls having thickness of at most 30 mm.

33. The apparatus of claim 19, in which the structure and/or controllability over the operation of each process stage and/or each module is established independently from the other stages and/or modules.

34. The apparatus of claim 24, further comprising an additional refinery- and/or a heat exchanger facility connectable to the at least one non-exhaust module disposed between the inlet module and the exhaust module.

35. Use of the apparatus as defined in claim 1 for thermal- or thermochemical cracking of hydrocarbon-containing feedstock.

36. Use according to claim 35, for executing an at least one procedure selected from the group consisting of: processing hydrocarbon feedstock containing medium and light weight hydrocarbon fractions; processing gasified carbohydrate-containing feedstock matter, processing gasified glyceride- and/or fatty acid-containing feedstock matter, and processing gasified cellulosic biomass material.

37. An arrangement comprising at least two apparatuses according to claim 1, functionally connected in parallel or in series.

38. The arrangement of claim 37, wherein the at least two apparatuses are connected to mirror each other, whereby their shafts are at least functionally connected.

39. A method for conducting chemical reactions in a process fluid, comprising:
  a. obtaining an apparatus comprising:
    a central shaft with a number of axial-radial rotors mounted thereon, each said rotor comprises a plurality of axial-radial rotor blades arranged over the circumference of a disk mounted onto the central shaft,
    a plurality of stationary vanes disposed upstream the rotor, and
    a mixing space disposed downstream of the rotor, wherein the plurality of stationary vanes, the plurality of axial-radial rotor blades and the mixing space establish a process stage;
  b. adjusting the rotation speed of the rotor to a predetermined speed or a speed range to reach the process fluid flow rate that satisfies the requirements imposed by the process;
  c. adjusting a preheating level of the feedstock containing process fluid;
  d. directing a feedstock containing process fluid flow subsequently through the at least one stage such, that in the mixing space mechanical energy imparted to the process fluid by the rotor is converted into internal energy of said process fluid, thus promoting chemical reactions in the process fluid to occur.

40. The method of claim 39, wherein the feedstock comprises hydrocarbons.

41. The method of claim 39, wherein residence times and/or the yield are individually adjustable within each stage by modularly modifying geometry and/or the dimensional parameters of the mixing space.

42. The method of claim 39, wherein the feedstock containing process fluid flow rate is adjustable during the operation.

* * * * *